United States Patent [19]

Binder et al.

[11] Patent Number: 6,058,819
[45] Date of Patent: May 9, 2000

[54] VERTICAL BOARD SAW

[75] Inventors: Werner Binder, Stuttgart; Martin Schietinger, Oberboihingen, both of Germany

[73] Assignee: Reich Spezialmaschinen GmbH

[21] Appl. No.: 08/968,692

[22] Filed: Nov. 11, 1997

Related U.S. Application Data

[63] Continuation of application No. PCT/EP96/00999, Mar. 8, 1996.

[30] Foreign Application Priority Data

May 31, 1995 [DE] Germany .......................... 195 19 870
May 12, 1995 [DE] Germany .......................... 195 17 488

[51] Int. Cl.[7] .................................................. B26D 7/08
[52] U.S. Cl. ............................. 83/168; 83/100; 83/471.3; 83/477.1; 83/488
[58] Field of Search .......................... 83/100, 177, 471.3, 83/477.1, 488, 168

[56] References Cited

U.S. PATENT DOCUMENTS

| | | | |
|---|---|---|---|
| 3,795,164 | 3/1974 | Schneider | 83/100 |
| 4,003,276 | 1/1977 | Schmitt | 83/100 |
| 4,192,104 | 3/1980 | Patenaude | 83/100 |
| 4,255,995 | 3/1981 | Connor | 83/100 |
| 4,638,695 | 1/1987 | Striebig | 83/477.1 |
| 5,148,732 | 9/1992 | Striebig | 83/477.1 |
| 5,537,748 | 7/1996 | Takahashi et al. | 83/100 |

Primary Examiner—M. Rachuba
Attorney, Agent, or Firm—Cummings & Lockwood

[57] ABSTRACT

In order to manage with a lower suction capacity of the sawdust fan in the case of a vertical board saw with a sawing unit movable horizontally and vertically, a support grid receiving a workpiece, being arranged essentially vertically and displaceable in the vertical direction, this grid comprising a plurality of support bars arranged horizontally and in parallel spaced relation to one another as well as suction channels arranged at right angles hereto and opening towards the workpiece, and a device for collecting the sawdust resulting on the side of the support grid during horizontal cutting, it is suggested that the support bars be designed as essentially closed channels each with a slot-shaped opening extending essentially along the entire length of the support bar, an edge of the saw blade of the sawing unit being able to enter this opening essentially without making contact during the horizontal cutting, and that the support bar channels be connected to a sawdust collecting means, wherein the support bar channels form at the same time part of the device for collecting the sawdust resulting on the side of the support grid during the horizontal cutting.

8 Claims, 6 Drawing Sheets

VERTICAL BOARD SAW

CROSS-REFERENCE TO RELATED APPLICATIONS

This is a continuation of International Application PCT/EP96/00999, with an international filing date of Mar. 8, 1996, which claims priority to German Patent Application No. 195 17 488.7 filed May 12, 1995 and German Patent Application No. 195.19 870.0 filed May 31, 1995.

The invention relates to a vertical board saw with a sawing unit movable horizontally and vertically, a support grid which receives a workpiece, is arranged essentially vertically and displaceable in the vertical direction and which comprises a plurality of support bars arranged horizontally and in parallel spaced relation to one another as well as suction channels arranged at right angles hereto and opening towards the workpiece, and a device for collecting the sawdust resulting on the side of the support grid during horizontal cutting.

Such vertical board saws are used in many cases for sawing board materials to predetermined sizes, wherein the vertical cuts are carried out at permanently prescribed positions of the board saw which correspond to those of the vertically extending suction channels and at which the edge of the saw blade enters the opening of the suction channels pointing forwards, i.e. towards the sawing unit.

It is necessary to reliably remove, retain, where necessary also draw off the sawdust by suction in order to prevent any impairment of the health of the personnel operating the board saw.

Whereas the suction channels permit the sawdust resulting behind the workpiece, i.e. on the side of the support grid, to be removed by suction and discharged at predetermined positions during vertical cutting, the problem for horizontal cutting has so far been overcome by covering the rear side of the board saw altogether with a wall. In one embodiment it is provided for channels to be formed between the support bars and the rear wall, these channels being closed during abutment of a workpiece to be sawn on the front side, i.e. when viewed from the sawing unit, and exhausted via a fan when the horizontal cut is made. On account of the large cross section of the channels, powerful fans are required in order to ensure an adequate discharge effect for the sawdust.

On the other hand, it has been suggested to replace the support grid by a panel with a plurality of slots in the horizontal direction and to keep the terminating rear wall of the board saw. The slots in the support panel are narrowed to slots which allow the edge of the saw blade to pass through essentially free of contact during horizontal cutting. The distance of the rear wall of the board saw from the support wall is selected to be large so that dust particles which strike the rear wall are not catapulted forwards again and, possibly, through the slot opening and thus can again reach the atmosphere surrounding the board saw.

With this constructional solution, the sawdust falls downwards as far as the floor area of the board saw where a suction pipe is provided which collects and removes the majority of the falling sawdust. The portions of the sawdust which are not removed by the suction pipe can be removed from the board saw by means of a hinged floor.

A disadvantage of this board saw is the open cross section which is still very large as well as the large rearward space between the rear wall and the support wall of the board saw which has to be cleaned.

The object of the present invention is therefore to present a vertical board saw which manages with a smaller suction capacity of the sawdust fan.

This object is accomplished in accordance with the invention, in a board saw of the type described at the outset, in that the support bars are designed as essentially closed channels each with a slot-shaped opening extending essentially along the entire length of the support bar, an edge of the saw blade of the sawing unit being able to enter this opening essentially without making contact during the horizontal cutting, and that the support bar channels are connected to a sawdust collecting means, wherein the support bar channels form at the same time part of the device for collecting the sawdust resulting on the side of the support grid during the horizontal cutting.

It has surprisingly been shown that with the design of the support bars as channels, into which the sawdust resulting on the side of the support grid is introduced by means of the saw blade, very good results are already achieved in the removal of the sawdust portions resulting on the side of the support grid. In contrast to the state of the art described above, the rearward wall area of the support bar channels is not removed to any great extent from the entry slots for the edge of the saw blade but, as a rule, only a few centimeters, and nevertheless the problem of the catapulting of the sawdust back through the slot into the free atmosphere surrounding the board saw is avoided to a considerable extent. The reason for this may be that a flow of air is generated in the relatively small cross section of the support bar channels as a result of the edge of the saw blade and this flow of air provides the sawdust portions with a relatively large pulse component in longitudinal direction of the support bar so that, in the end, a transport of the sawdust in longitudinal direction of the support bar channels predominates and the pulse components of the sawdust directed transversely thereto have less effect.

As a result of the turbulences occurring in addition in the channel, additional pulse components are superposed on the dust particles which make any immediate catapulting back from the rear wall through the entry slot of the edge of the saw blade more unlikely.

The support bar channels can be provided at regular intervals with an opening, from which the sawdust can be removed. In a preferred embodiment of the invention it is provided for the support bar channels to open with one end into one of the vertically arranged suction channels, the latter hereby forming the sawdust collecting means for the support bar channels. This means that an additional sawdust collecting means for the horizontal cutting is unnecessary since that already provided in any case for the vertical cutting and connected to the suction channels can be used jointly.

As a result of the drastically reduced free cross section of the support bar channels, compared to the other known solutions in the state of the art, the normal suction capacity planned for the vertical suction channels is sufficient since, as mentioned above, air is introduced into the channel by means of the edge of the saw blade and a flow of air is generated in this channel. The suction capacity set for the suction channels then serves essentially only to draw off the sawdust entering the suction channels from the support bar channels.

In order to achieve a more extensive reduction in the sawdust present in the atmosphere surrounding the board saw, it may be provided for deflector surfaces to be arranged in the support bar channels, these surfaces extending away from the wall area containing the slot-shaped opening in the interior of the channels and forming an acute angle with the longitudinal direction of the channels. The free ends of the deflector surfaces thereby point in the direction of the flow of air in the support bar channel which is generated by the edge of the saw blade.

The deflector surfaces will preferably extend over at least half of the height of the support bar channels (seen in the direction of the penetrating saw blade) but often not essentially beyond this so that an adequate free cross section remains in the area of the channel removed from the longitudinal slot in the support bar channel for the transport of the sawdust.

The angle which the deflector surfaces form with the longitudinal direction of the channels is approximately 20° to approximately 45°. In general, the deflector surfaces will be oriented such that they are arranged approximately parallel to the tangent of the circular circumference of the saw blade at its point of entry into the channel.

As a result, the sawdust particles thrown off approximately tangentially from the saw teeth of the edge of the saw blade will first of all be thrown off from the saw blade without any hindrance and thus reach the rearward area of the support bar channel with its free cross section essentially in free flight.

A further improvement in the freedom from dust of the air surrounding the board saw is achieved when the deflector surfaces are designed and arranged such that two adjacent surfaces overlap one another in the longitudinal direction. This means that the attachment of the one deflector surface to the wall area of the channel adjacent to the slot is overlapped somewhat by the free end of the adjacent deflector surface so that in a plan view of the slot of the support bar channel the rearward wall of the support bar channel remains essentially covered by the deflector surfaces.

The deflector surfaces can, on the one hand, represent essentially plane surfaces or, however, in order to achieve a higher efficiency during the generation of a flow of air into the support bar channels, be designed as a part-cylindrical surface, the radius of which essentially corresponds to or is greater than the radius of the saw blade.

When the suction channels are used as sawdust collecting means for the support bar channels, a guide element directed downwards is preferably built into the suction channels at the points of entry of the support bar channels. This ensures that the sawdust entering the suction channel from the support bar channels cannot disperse vertically upwards in the suction channel but is guided at the same time downwards in the direction towards the outlet of the suction channel. Moreover, the suction channels can also be equipped essentially along their entire length with deflector surfaces, as is preferred for the support channels.

This can be aided, in addition, by a further guide element being arranged on the side of the support bar channel at its end connected to the suction channel, this guide element interacting with the guide element of the suction channel and already superposing a component directed vertically downwards on the sawdust when this exits out of the support bar channel.

The inventive solution, as presented, for a removal by suction on the side of the support grid of the sawdust during horizontal cutting is a very simple and inexpensive solution since the support bars can, for example, be extruded in plastic and then provided with the necessary dip-in slots for the edge of the saw blade, for example, during the first sawing procedure. The longitudinal slots in the slot bar channels can, of course, also be prefabricated.

Furthermore, the inventive support bar channels can also be used for the vertical removal by suction so that the multitude of parts in the board saw is reduced. In the case of the inventive board saw, the risk of accidents is considerably reduced since the saw blade projecting on the rear side of the workpiece is always covered by the support bar channel during horizontal cutting or by the suction channel during vertical cutting.

As a result of the contact surfaces on both sides of the saw blade, even the smallest parts can be held by hand and sawn without any risk.

The handling of the workpiece is improved in comparison with the state of the art above all due to the fact that a space is st ill present between the individual support bars which allows engagement therein without any risk and so the workpiece can also be gripped and held between the support bar channels.

One advantage of the present invention is to be seen, finally, in the fact that the rear wall covering the entire board saw can be completely omitted, whereby assembly of the machine is shortened.

Moreover, the machine again becomes transparent and can thus be erected without problem in front of a window front without the brightness of the room and the incidence of light through the windows into the operating space being thereby impaired to any greater extent.

These and further advantages of the invention will be explained in greater detail in the following on the basis of the drawings. These drawings show in detail.

Figure 1:
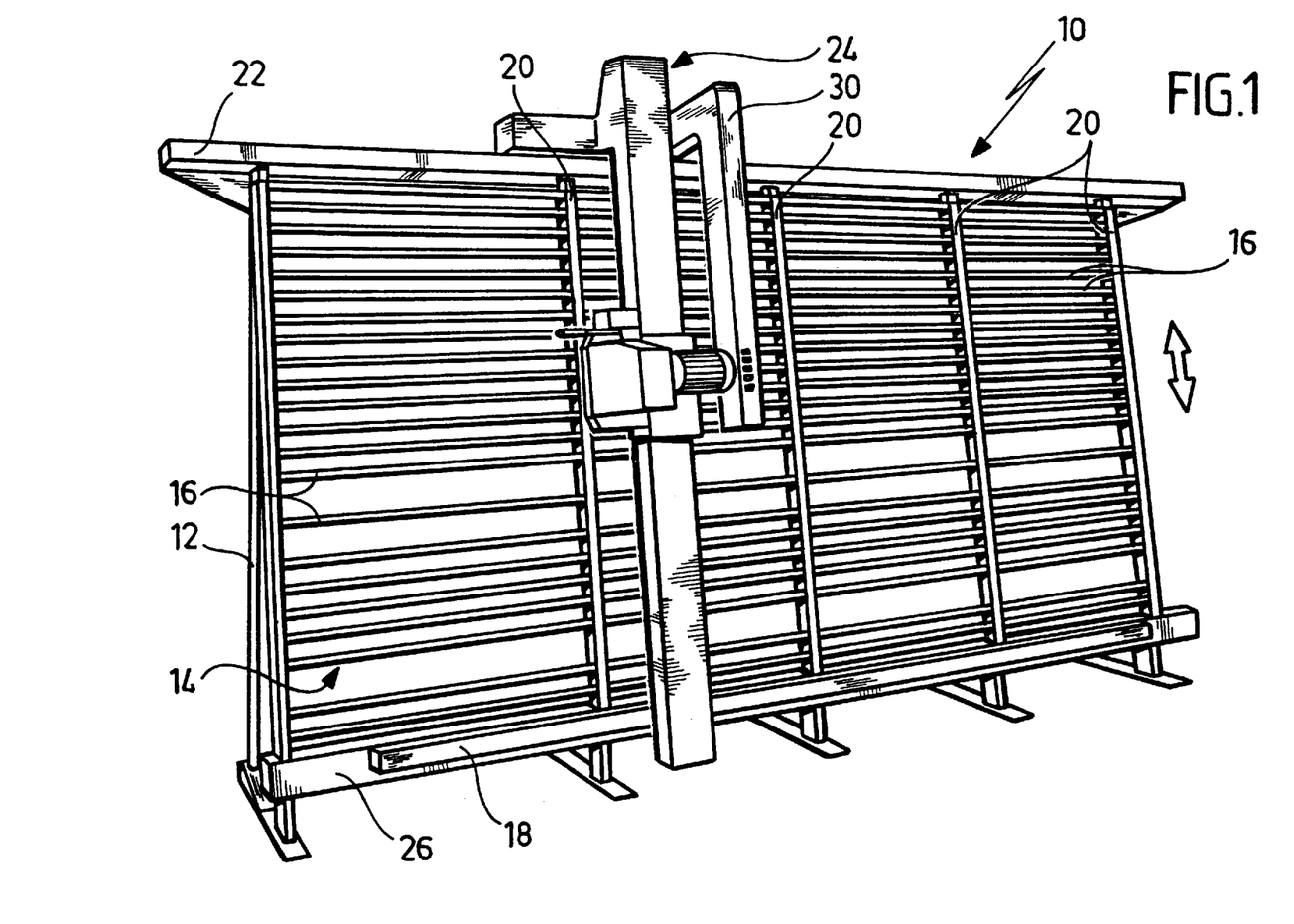
FIG. 1 a perspective illustration of an inventive board saw.

The inventive board saw illustrated in FIG. 1 is designated as a whole with the reference numeral 10. The vertical board saw 10 comprises, apart from a machine frame 12, a support grid 14 on the front side which is borne by the machine frame so as to be vertically displaceable and which comprises a plurality of horizontally extending, parallel support bars 16 which form a contact surface for board-like workpieces to be sawn which is inclined slightly in relation to the vertical. A locating fence 18 which supports the board-like workpiece is arranged at the lower end of the support grid 14. This locating fence 18 is provided with an opening or perforated at the locations of the support grid provided for the vertical cutting so that the saw blade of the board saw can be guided further downwards during vertical cutting, crossing the locating fence 18, in order to complete the vertical cut (these details are not shown in the drawings).

Suction channels 20 arranged at right angles to the support bars 16 are arranged at regular intervals in longitudinal direction of the support grid 14; these suction channels are located in a plane with the support bars 16 and, where necessary, serve to hold the support bars 16, i.e. as constructional element of the support grid 14.

A track 22, on which a sawing unit holder 24 is arranged for displacement, is arranged at the upper end of the machine frame 12. The sawing unit holder 24 is supported at its lower end on a lower frame bar 26 which forms the lower limit of the support grid 14 and its vertical movement and, at the same time, bears the locating fence 18.

The holder 24 serves for the vertically displaceable mounting of a sawing unit 28 which is mounted on the holder 24 so as to be pivotable through 90° C. so that cuts can be made with the same sawing unit not only in vertical direction but also in horizontal direction (the latter by displacing the holder 24 along the track 22).

Fixed positions are provided along the support grid or rather the machine frame for vertical cutting, namely at those points, at which the vertical suctions channels 20 are provided which open forwards, i.e. in the direction towards the workpiece and the sawing unit, respectively, with a continuous, slot-shaped opening. The saw blade of the sawing unit then dips into this longitudinal slot during vertical cutting.

During horizontal cutting, the vertically displaceable support grid 14 is aligned with the saw blade of the sawing unit 28 such that a longitudinal slot provided in one of the support bars 16 is aligned with the position of the saw blade so that this can dip into the slot during horizontal cutting. In addition, a suction device 30 is arranged on the holder 24 and this extends with an arm designed in an L shape from the upper end of the machine frame 12 parallel to the vertical guide means of the holder 24 and is connected with its lower, free end to the housing of the sawing unit 28 via a tube (not illustrated). This suction device 30 removes sawdust resulting on the upper side of the workpiece, i.e. on the side of the sawing unit.

Figure 2:
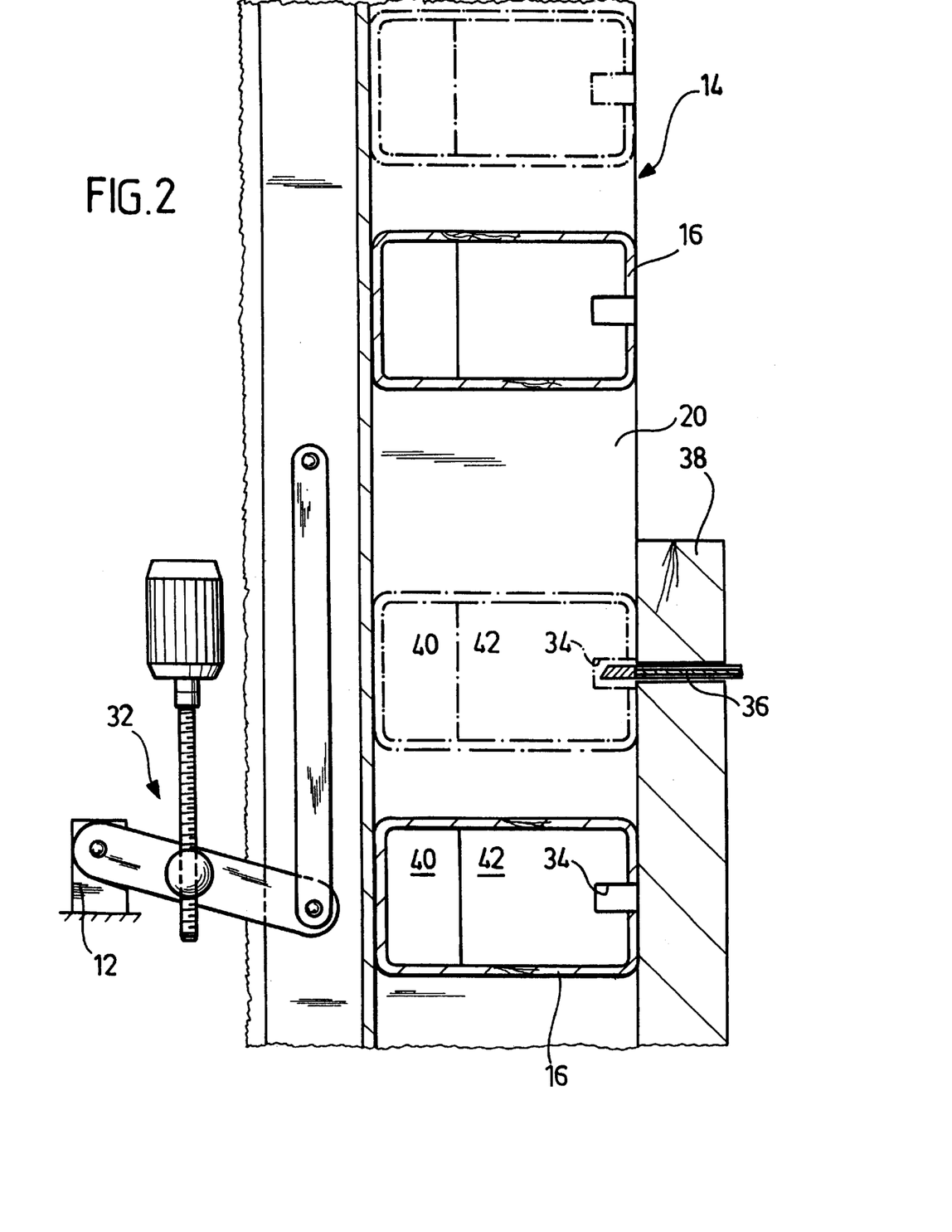
FIG. 2 a sectional illustration in the area of a support grid of the inventive board saw from FIG. 1.

FIG. 2 shows a detail from a sectional illustration extending at right angles to the support bars 16. The support grid 14 formed from the support bars 16 may be displaced in vertical direction (for example, between the positions of the support bars 16 illustrated as solid and as dash-dot lines) via a drive unit 32 which is supported on the side of the machine frame. When the solid-line illustration of the support bars 16 represents the normal position, and these are lifted into the position illustrated by dash-dot lines, a cut is intended to be made at the height shown in FIG. 2. As a result, the longitudinal slot 34 comes exactly into the position, in which the saw blade 36 cuts so that the saw blade 36 penetrating the workpiece 38 with its edge can carry out the horizontal cut without damaging the support grid.

In this illustration, the interior construction of the support bars 16 can also be seen, which, apart from the longitudinal slot 34, consists of a free cross section 40 and a cross section 42 containing deflector surfaces in the form of fins.

Figure 3:
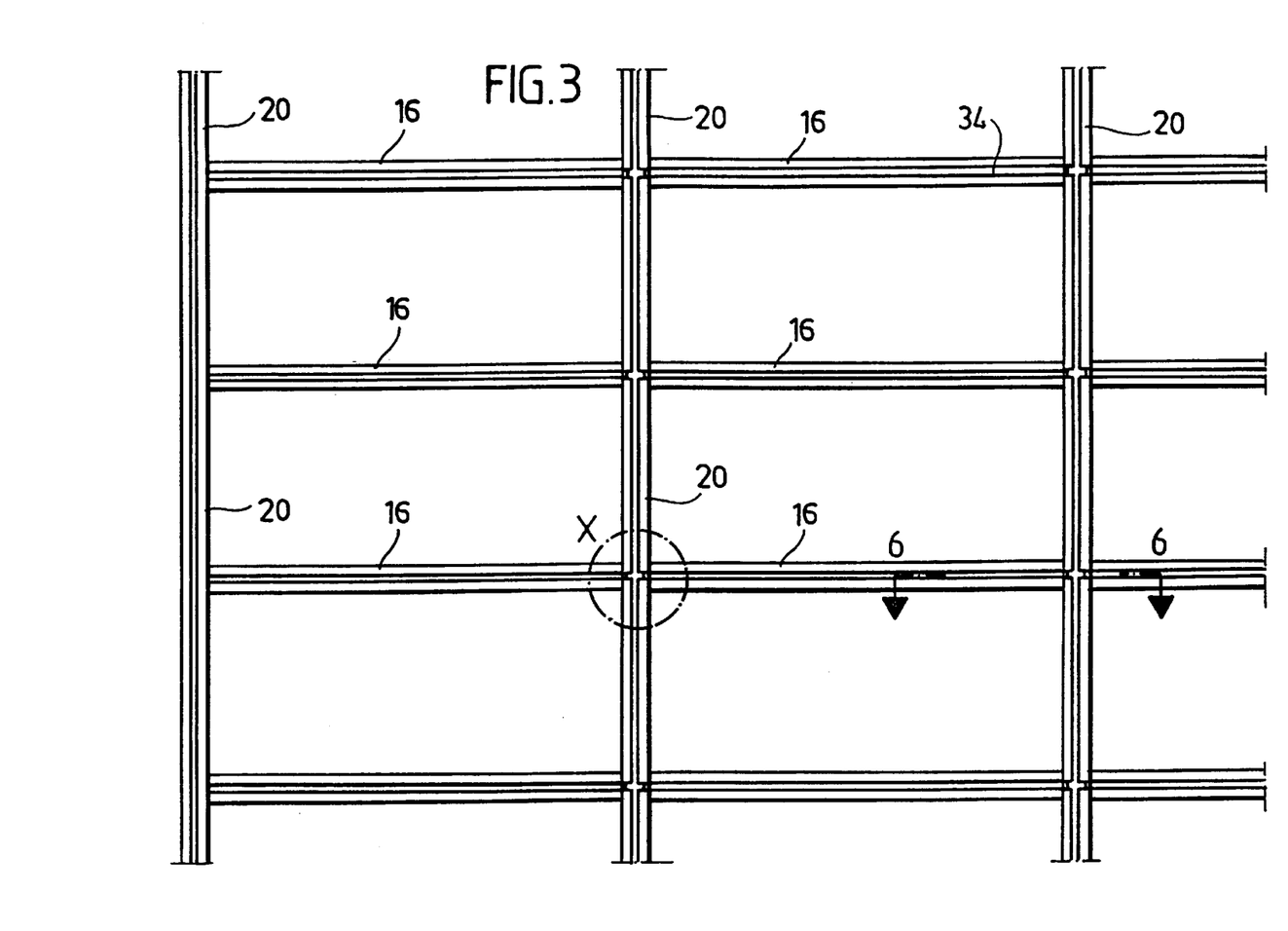
FIG. 3 an enlarged section of a support grid of the inventive board saw.
Figure 4:
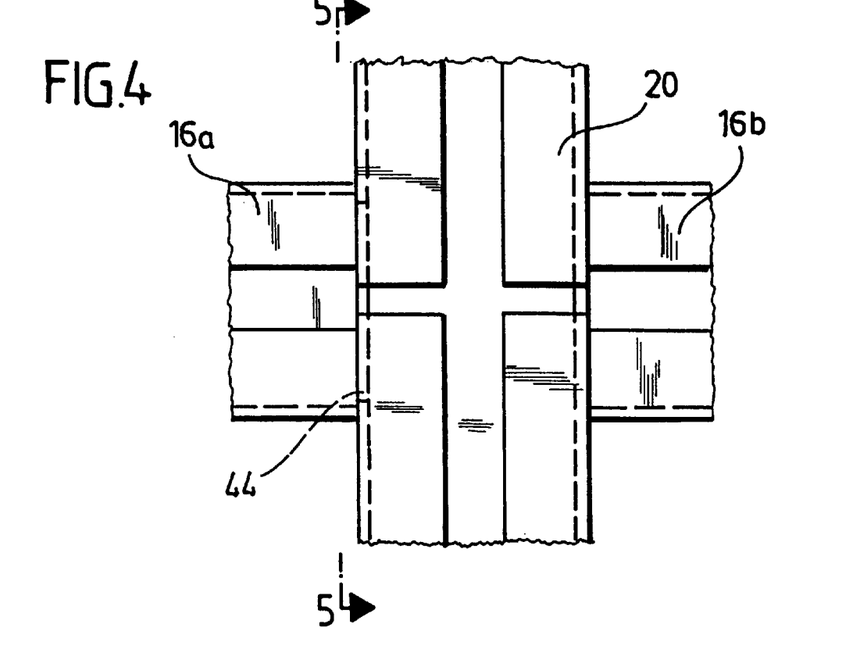
FIG. 4 detail X from FIG. 3 in an enlarged illustration.
Figure 5:
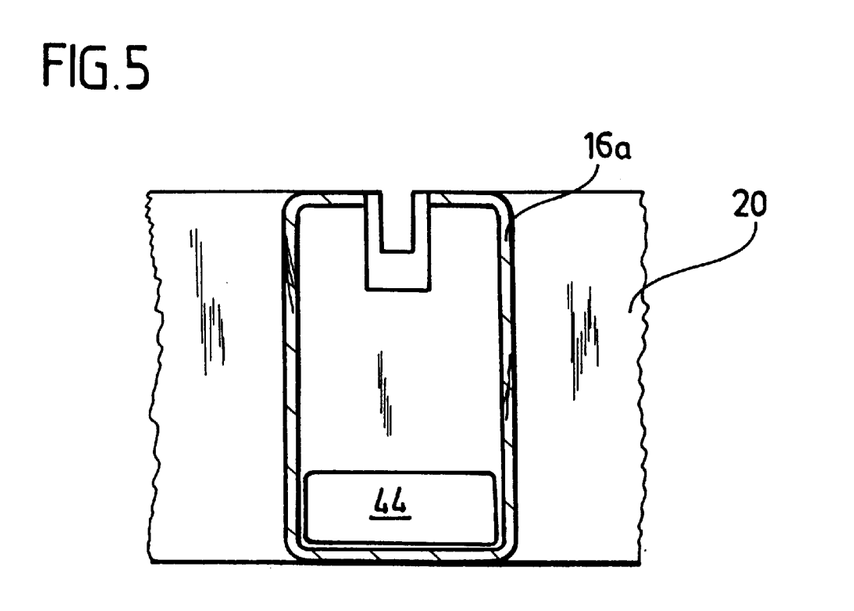
FIG. 5 a sectional view along line 5—5 in FIG. 4.

As is apparent from FIG. 3, the support bars 16 extend between two vertical suction channels 20, wherein each section of the support bars 16 opens on one side into a suction channel 20 whereas, with its other end, it adjoins the other suction channel without any connection. As a result, this leads to a defined direction of transport for the sawdust to be transported away within the support bar 16 which results, firstly, due to the amount of air introduced into the support bar by the saw blade or rather the edge of the saw blade and the flow of air generated thereby and, secondly, due to the suction effect of the suction channels 20. The connection of suction channel 20 and support bar 16 is illustrated again in FIG. 4 as an enlarged detail. While the section 16a of a support bar 16 opens into the suction channel 20 with a free cross section 44 (cf. FIG. 5), the section 16b of a support bar 16 abuts on a closed wall of the suction channel 20. Due to the fact that only the longitudinal slots 34 in the support bars 16 as well as the longitudinal slots in the suction channels 20 serve as openings for the entry of air, wherein a large proportion of the longitudinal slots 34 of the support bars 16 are regularly covered when the board saw is in operation, only a low suction capacity of the suction means is necessary in order to ensure an adequate transport capacity for the resulting sawdust. In addition, as already mentioned above, the removal of chippings and sawdust is aided by the air space introduced by the edge of the saw blade into the channels of the support bars 16. The interior of the support bars 16 will be explained in greater detail on the basis of FIG. 6.

Figure 6:
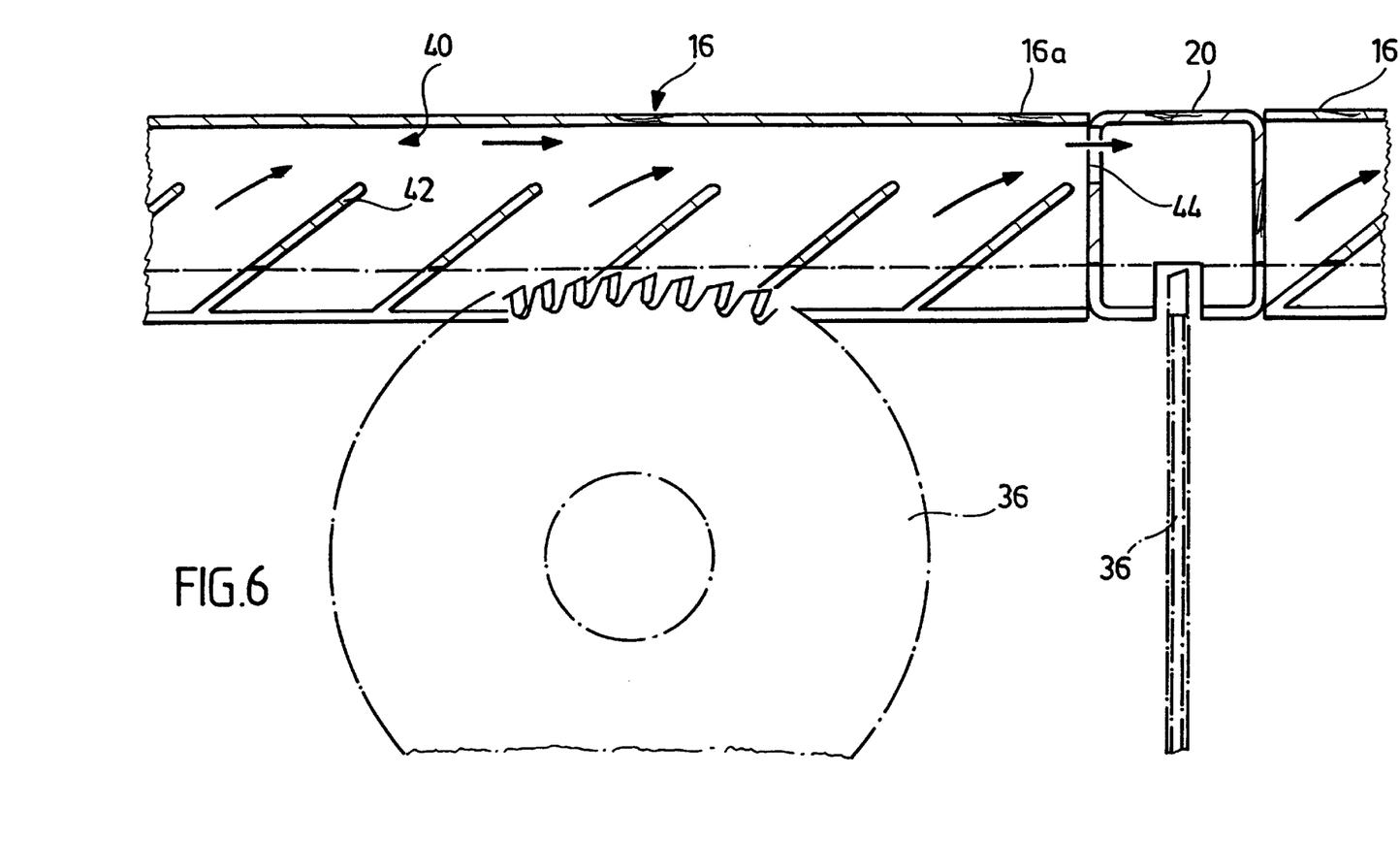
FIG. 6 a sectional view along line 6—6 in FIG. 3.
Figure 7:
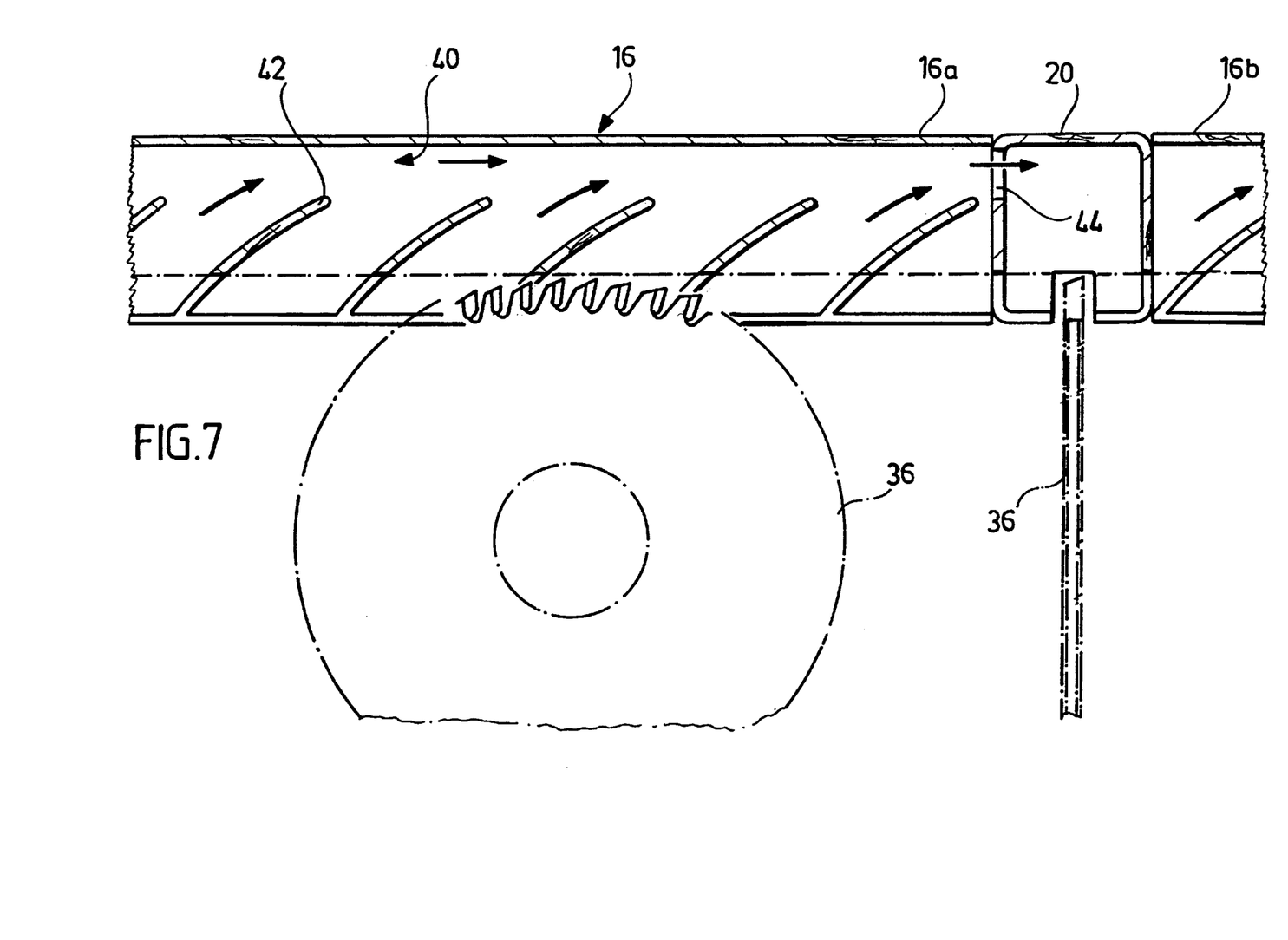
FIG. 7 is a section view along line 6—6 in FIG. 3 with the reflector surfaces being shown as having a part-cylindrical surface.

The support bars 16 are designed essentially as hollow members which open forwards, i.e. in the direction towards the resting workpiece or likewise towards the sawing unit 28, via a longitudinal slot 34. In the interior of the support bars 16, fins 42 are preferably arranged at regular intervals, these forming an acute angle with the longitudinal direction of the support bars 16, for example, as in the example shown, approximately 40°. The fins thus extend approximately in tangential direction in relation to the entering saw blade. The deflector surfaces or fins 42 have two functions; on the one hand, they guide the flow of air generated by the edge of the saw blade to the free cross section 40 and, as a result of a narrowing of the flow cross section in the support bar 16, effect an acceleration of the flow velocity; on the other hand, they prevent sawdust particles being deflected from the rearward wall of the support bar 16 directly to the longitudinal slot 34, and for particles with such flight behavior offer first of all a deflector surface which causes the particles to pass back again into the rearward space in the support bar 16. This means that the sawdust particles are conveyed in the direction towards the suction channel 20 essentially without the aid of a suction flow, which is also achieved to a certain degree by the suction channel 20, where they are then accelerated downwards in vertical direction and are removed by suction, for example, in the lower frame bar 26 which can function as a collecting channel. The support bars 16 of the support grid 14 as well as, where necessary, the suction channels 20 can be produced first of all with a closed profile without the respective longitudinal slots, wherein the corresponding longitudinal slot is then cut free by the saw blade at the location associated with a respective support bar 16 or suction channel 20 during the first cut in horizontal or in vertical direction.

Whereas the vertical cut is determined by the fixed positions of the suction channels 20, the horizontal cut can take place at any optional height since the vertically displaceable support frame 14 can be set each time exactly at the cutting position of the saw blade 36 so that during each horizontal cut, irrespective of the height, the edge of the saw blade 36 enters a longitudinal slot 34 of a support bar 16.

We claim:

1. Vertical panel saw having a horizontally and vertically displaceable saw unit, having a substantially vertically arranged and vertically movable support grid which receives a workpiece and which comprises a multiplicity of horizontally arranged support bars which are spaced from one another in parallel, and exhaust channels, which are arranged perpendicularly thereto and which open towards the workpiece, and having an apparatus for receiving the saw dust which is produced on the support grid side during horizontal cutting, such that the support bars are in the form of substantially closed channels, each having an elongate opening which extends substantially over the entire length of the support bar and into which an edge of a saw blade of the saw unit can enter in a substantially contact-free manner during horizontal cutting, and in that the support bar channels are connected to a saw dust receiving device, the support bar channel at the same time forming a portion of the apparatus for receiving the saw dust which is produced on the support grid side during horizontal cutting and, with one end, flowing into an exhaust channel, which also forms a portion of the saw dust receiving device, and the exhaust channels having a downwardly directed guide element at the entry points of the support bar channels.

2. Panel saw according to claim 1, wherein the support bar channels contain baffle plates which extend inside the channels, away from the wall region that contains the elongate opening, and which form an acute angle with the longitudinal direction of the channels.

3. Panel saw according to claim 2, wherein the baffle plates extend over at least half of the height of the support bar channels.

4. Panel saw according to claim 2, wherein the angle which the baffle plates form with the longitudinal direction of the channels is from approximately 20° to approximately 45°.

5. Panel saw according to claim 2, wherein the baffle plates are arranged in such a manner that two adjacent plates overlap one another in the longitudinal direction.

6. Panel saw according to claim 2, wherein the baffle plate has a partially cylindrical face whose radius is substantially equivalent to or greater than the radius of the saw blade.

7. Panel saw according to claim 2, wherein the baffle plates are arranged at the point of entry of the saw blade into the channel and are approximately parallel with the tangent of the periphery of the saw blade.

8. Panel saw according to any one of the claims, wherein the support bar channels have, at their end connected to an exhaust channel, a guide element which guides the saw dust produced in the support bar channel into the associated exhaust channel with a component which is directed vertically downwards.

* * * * *